United States Patent
Mergenthaler

(10) Patent No.: US 8,506,213 B2
(45) Date of Patent: Aug. 13, 2013

(54) CUTTING INSERT, IN PARTICULAR FOR COUNTERBORING AND/OR COUNTERSINKING OPERATIONS

(75) Inventor: Peter Karl Mergenthaler, Markt Bibart (DE)

(73) Assignee: Kennametal Inc., Latrobe, PA (US)

( * ) Notice: Subject to any disclaimer, the term of this patent is extended or adjusted under 35 U.S.C. 154(b) by 1076 days.

(21) Appl. No.: 12/516,137

(22) PCT Filed: Jul. 19, 2007

(86) PCT No.: PCT/EP2007/006401
§ 371 (c)(1),
(2), (4) Date: Jul. 2, 2009

(87) PCT Pub. No.: WO2008/083725
PCT Pub. Date: Jul. 17, 2008

(65) Prior Publication Data
US 2010/0047028 A1 Feb. 25, 2010

(30) Foreign Application Priority Data
Dec. 21, 2006 (DE) .......................... 10 2006 060 664

(51) Int. Cl.
*B23B 51/08* (2006.01)
(52) U.S. Cl.
USPC ........................................ 408/225; 408/188
(58) Field of Classification Search
USPC ................. 408/224, 225, 713, 223, 188, 231, 408/233

IPC ....................................................... B23B 51/08
See application file for complete search history.

(56) References Cited

U.S. PATENT DOCUMENTS

| | | | |
|---|---|---|---|
| 5,904,449 A * | 5/1999 | Satran et al. ................ | 407/59 |
| 6,503,030 B2 * | 1/2003 | Kress et al. ................ | 408/188 |
| 6,872,035 B2 * | 3/2005 | Kress et al. ................ | 408/1 R |
| 7,029,210 B2 * | 4/2006 | Schlagenhauf ............. | 408/153 |
| 7,131,798 B2 * | 11/2006 | Karlsson et al. ............ | 408/191 |
| 7,296,953 B2 | 11/2007 | Kuenzel | |
| 2003/0039521 A1 | 2/2003 | Kress et al. | |

(Continued)

FOREIGN PATENT DOCUMENTS

| | | |
|---|---|---|
| EP | 1 281 466 B1 | 11/2006 |
| JP | 07-237027 | 9/1995 |

(Continued)

OTHER PUBLICATIONS

Japanese Patent Office, "Notice of Reasons for Rejection", with English language translation thereof, Apr. 24, 2012, 12 pp.

(Continued)

*Primary Examiner* — David Bryant
*Assistant Examiner* — Jason L Vaughan
(74) *Attorney, Agent, or Firm* — Larry R. Meenan, Esq.

(57) ABSTRACT

In the case of a cutting insert, in particular for counterboring and/or countersinking operations, the cutting insert has two longitudinal sides and two narrow sides between an upper side and an underside. A cutting edge is formed between one longitudinal side and one narrow side and runs obliquely in relation to the underside and extends over at least approximately the entire depth of the cutting body. A cutting face running between the upper side and the underside is provided in the longitudinal side that is facing the cutting edge.

11 Claims, 4 Drawing Sheets

(56) References Cited

U.S. PATENT DOCUMENTS

Figure 1:
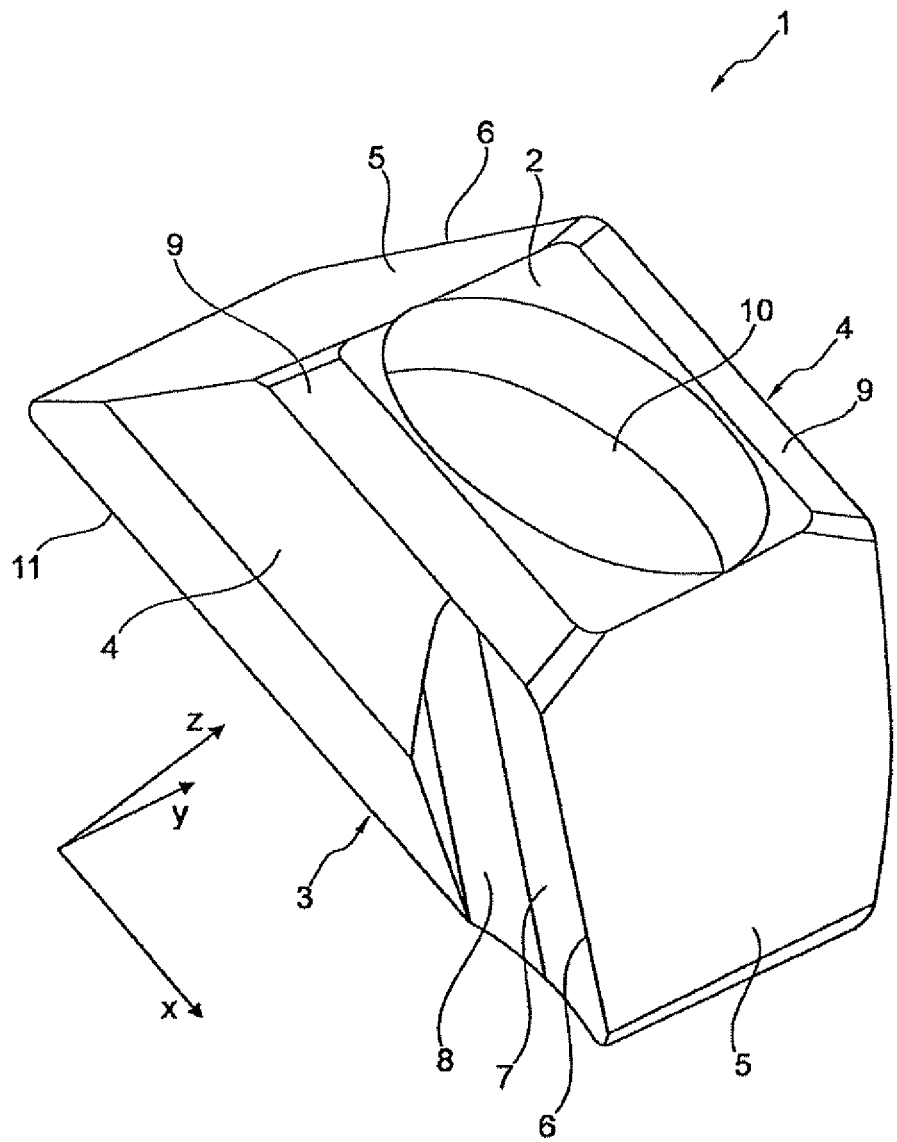

| | | |
|---|---|---|
| 2006/0045636 A1 | 3/2006 | Johnson et al. |
| 2006/0110227 A1 | 5/2006 | Kruszynski et al. |
| 2008/0232915 A1 | 9/2008 | Reinhardt et al. |

FOREIGN PATENT DOCUMENTS

| | | |
|---|---|---|
| JP | 08-047803 | 2/1996 |
| JP | 2002/052415 | 2/2002 |
| JP | 2003-117709 A | 4/2003 |
| RU | 2028880 C1 | 2/1995 |
| SU | 1166912 A1 | 7/1985 |
| SU | 1340923 A1 | 9/1987 |
| WO | WO 2004/024381 | 3/2004 |
| WO | WO 2004/056518 | 7/2004 |
| WO | 2006/028837 A2 | 3/2006 |

OTHER PUBLICATIONS

Korean Patent Office, "Non-Final Rejection" (English translation included), Aug. 9, 2012, 12 pp.

* cited by examiner

CUTTING INSERT, IN PARTICULAR FOR COUNTERBORING AND/OR COUNTERSINKING OPERATIONS

The invention relates to a cutting insert, in particular for boring and/or counterboring operations, comprising a cutting body having at least one cutting edge. It also relates to an insert holder for accommodating at least one cutting insert of this kind.

A deep-hole drill having an insert holder is known from WO 2004/056518 A2 (PCT/DE2003/004274), said deep-hole drill being used for a predetermined nominal diameter range. An interchangeable cutting insert and at least one interchangeable guide strip are assigned to the deep-hole drill. While the actual cutting operation is carried out by means of a cutting edge of the cutting insert screwed to the insert holder, the tool is supported in the drill hole over its circumference during the drilling operation by the corresponding guide strips. The known deep-hole drill is suitable for diameter values from 16 mm up to about 40 mm. The known deep-hole drill is not suitable for comparatively small diameters drilled.

The object of the invention is to specify a cutting insert which is especially suitable in particular for boring and/or counterboring operations. The cutting insert and in particular an insert holder accommodating said cutting insert are also to be suitable for comparatively small diameters bored.

This object is achieved according to the invention with respect to the cutting insert by the features of claim 1. Advantageous configurations and developments are the subject matter of the subclaims.

To this end, the cutting insert or its parent body or cutting body has a top side and an underside opposite said top side at a distance apart. During use, the top side of the cutting insert is assigned to a bore wall, while the underside serves as a locating surface on an insert holder, which in turn is an integral part of a drilling or boring tool.

The cutting insert has two opposite narrow sides and two opposite longitudinal sides. Formed between a longitudinal side and a narrow side is a cutting edge which extends virtually approximately over the entire cutting body thickness. Starting from the top side, the cutting edge runs obliquely toward the underside. With reference to a z direction in which the cutting body thickness extends, and to an x direction which extends along the longitudinal side of the cutting insert, and to a y direction which extends along the narrow side, the cutting edge runs obliquely at an inclination angle toward the respectively opposite longitudinal side of the cutting body relative to a plane defined by the x direction and the z direction. This inclination angle is suitably between 10° and 30°, preferably about 20°.

The cutting edge preferably also runs inclined relative to a plane defined by the y direction and the z direction. The cutting insert suitably has two cutting edges of this kind which are arranged diagonally opposite one another. In this case, an acute angle is preferably formed between the respective narrow side and the underside, said angle expediently being approximately equal to 50°. Alternatively, for spot facing, in particular for 90° spot facing, an obtuse angle of, for example, 95° may also be formed between the respective narrow side and the underside.

In an especially preferred development, the cutting insert has at least one supporting surface which is assigned to the cutting edge and which, during the machining of a workpiece by means of the cutting insert, faces the bore wall produced by the latter itself. The cutting insert or the insert holder holding said cutting insert is supported on the bore wall by means of this supporting surface, which is negative with respect to a cutting circle of the cutting insert. The supporting surfaces advantageously integrated into the cutting insert or into the cutting body therefore permit the desired supporting function without having to provide additional guide elements. On account of the integration of this supporting function into the cutting body itself, high functionality is achieved with at the same time an especially space-saving geometry of the cutting insert and of the insert holder accommodating the latter. In this variant of the cutting insert, the cutting edge, starting from the inclined supporting surface, again runs along the entire remaining cutting body thickness.

A rake face is provided in the longitudinal side facing the cutting edge. Said rake face, which is expediently designed as a flute drawn into the cutting body, runs along the cutting edge extending between the top side and the underside of the cutting body or cutting insert. In the variant of the cutting insert having integrated supporting surfaces, the cutting edge again runs, starting from the inclined supporting surface, along the entire remaining cutting body thickness.

An especially preferred insert holder for accommodating at least one cutting insert of this kind has a holder land which adjoins a flute in the holder longitudinal direction or runs between two flutes and on which the cutting body is detachably held. The cutting insert is arranged tangentially in this case, wherein the respective cutting edge which is in use for the machining runs approximately radially with respect to the cutting circle of the insert or tool holder. The cutting insert is in this case preferably arranged above the center, that is to say that the cutting insert center plane defined by the x direction and the y direction and intersecting the narrow side in the side center lies at least slightly above the corresponding xz center plane of the insert holder. Therefore the supporting surface assigned to the respective cutting edge is at a smaller distance from the cutting circle and therefore, during use of the insert holder, at a smaller distance from the bore wall than the opposite supporting surface assigned to the other cutting edge. On account of the negative angle formed by the supporting surface, sufficiently little free movement is ensured with at the same time reliable support of the cutting insert on the bore hole wall.

For the retention and positioning of the cutting insert on the insert holder, the latter has a wedge-shaped cutting body receptacle having a first bearing surface, on which the cutting insert rests with its underside. The cutting insert bears against a second bearing surface of the wedge-shaped cutting body receptacle with that narrow side which forms with the corresponding longitudinal side the cutting edge which is not in use. The cutting insert is expediently fixed to the insert holder by means of a detachable screwed connection, for which purpose the cutting insert has a central through-hole for a corresponding fastening screw.

The advantages achieved with the invention consist in particular in the fact that, due to the geometry of the cutting insert according to the invention, having a cutting edge formed between a respective longitudinal side and a narrow side and inclined toward a central plane of symmetry, firstly a tangential arrangement or positioning of the cutting insert on an associated insert holder can be realized. As a result, boring and counterboring operations for producing especially small bore diameters, in particular less than 10 mm, e.g. greater than or equal to 8 mm, can be realized in turn. The integration of the supporting function, inclined or oriented negatively with respect to a cutting circle or the bore wall to be machined, in the cutting insert itself permits especially simple manipulation during the release of the cutting insert and when fastening it on the cutting body in a tangential position as prescribed.

Figure 2:
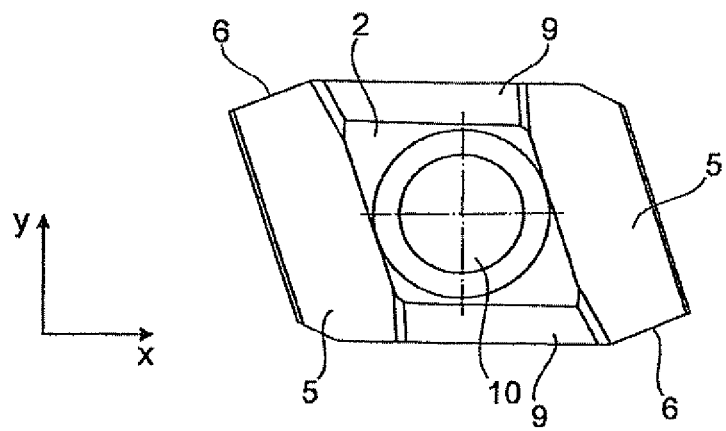
Figure 3:
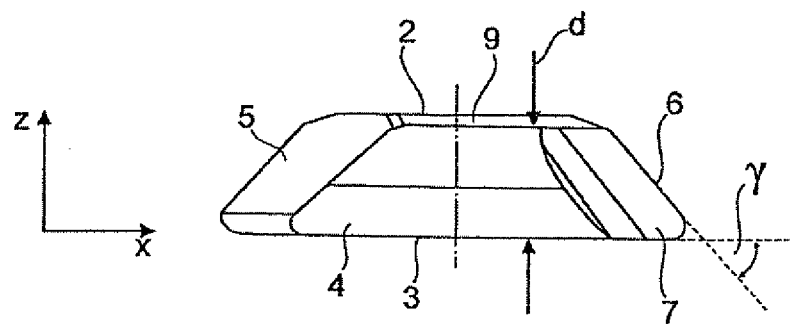
Figure 4:
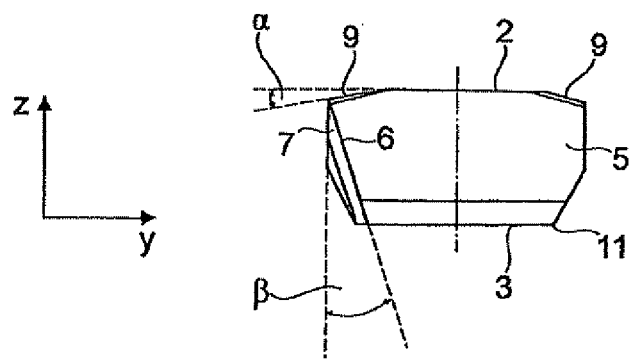
Figure 5:
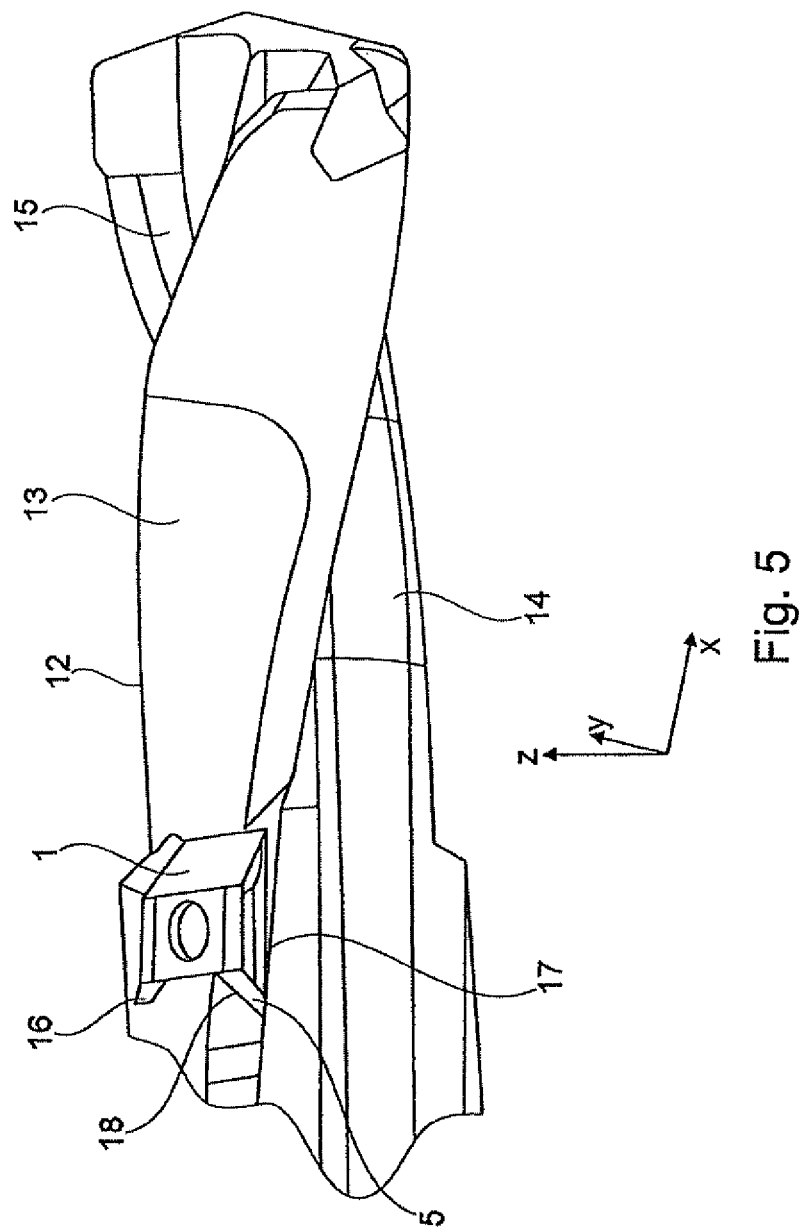
Figure 6:
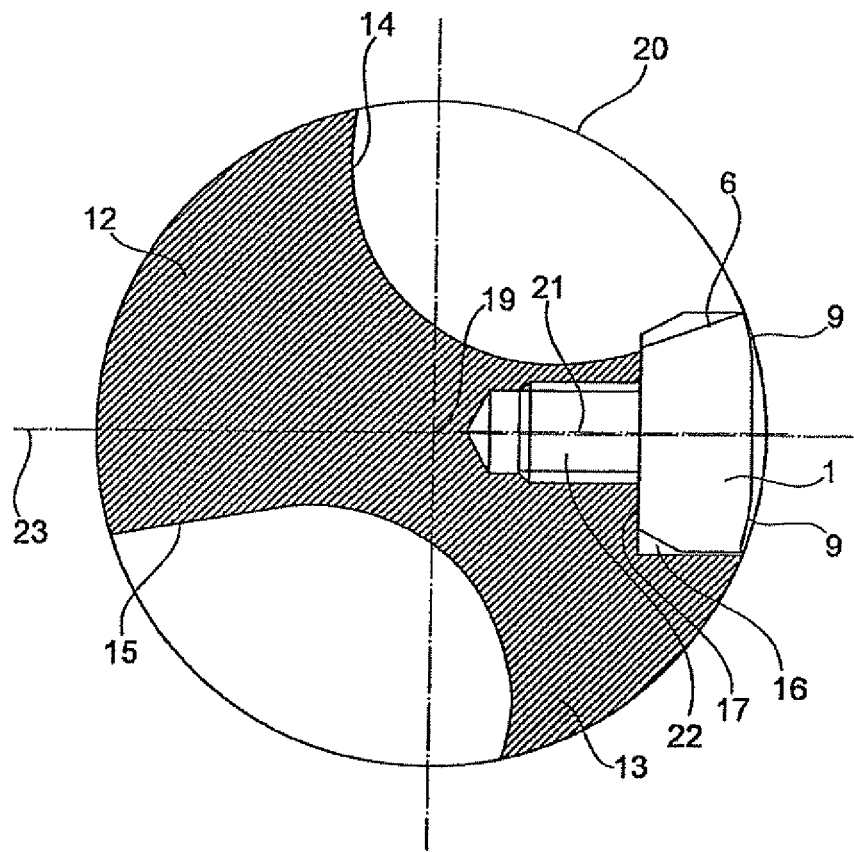

Exemplary embodiments of the invention are explained in more detail below with reference to a drawing, in which:

FIG. 1 shows a perspective illustration of a cutting insert according to the invention, having a cutting edge running obliquely between a longitudinal side and a narrow side, FIG. 2 shows the cutting insert according to FIG. 1 in a plan view, FIG. 3 shows the cutting insert in a side view of a longitudinal side, FIG. 4 shows the cutting insert in a side view of a narrow side, FIG. 5 shows a perspective illustration of an insert holder of a drilling tool having a cutting insert according to the invention, and FIG. 6 shows a cross section of the insert holder with a cutting circle of the cutting insert.

Corresponding parts are provided with the same designations in all the figures.

The cutting body 1 shown in FIGS. 1 to 4 serves as a cutting insert in conjunction with an insert holder, shown in a cutaway view and in a cross section in FIGS. 5 and 6, respectively, for boring and/or counterboring operations and in particular for producing bore diameters of less than, for example, 10 mm.

Between its top side 2 and its underside 3, the cutting body 1 has two opposite longitudinal sides 4 and two opposite narrow sides 5. A cutting edge 6 is formed between a longitudinal side 4 and a narrow side 5. The cutting body 1 shown has two of such cutting edges 6 at diagonally opposite side edges. Adjoining the respective cutting edge 6 is a rake face 7. Starting from the cutting edge 6, the rake face 7 runs along part of the longitudinal side 4 and is in this case designed as a roughly L-shaped flute drawn into the cutting body 1, with a rake face land 8 being formed.

Provided on the top side 2 of the cutting body 1 are two opposite supporting and bearing surfaces 9 which run along the respective longitudinal side 4 and are inclined at a negative angle α toward the latter. This angle or inclination angle α is about 20°. Between the two supporting surfaces 9, a hole 10 oriented in the z direction passes through the cutting body 1.

As can be seen in particular from FIGS. 1 and 3, the respective cutting edge 6, starting from the respective supporting surface 9, extends over the entire cutting body thickness d running in the z direction with respect to the coordinate system shown. In addition, the cutting edge 6 runs obliquely relative to the xz plane defined x direction running along the longitudinal side 4 and the z direction, as can be seen comparatively clearly in FIG. 4. The rake face 7 adjoining the respective cutting edge 6 therefore likewise extends over virtually the entire cutting body thickness d. The inclination of the respective cutting edge 6 with the inclination angle β is, starting from the top side 2, oriented toward the cutting body edge 11 formed between the underside 3 and the opposite longitudinal side 4. The inclination angle β is expediently about 20°.

As can be seen comparatively clearly from FIG. 3, the narrow sides 5 run obliquely relative to the yz plane defined by the y direction and the z direction. In this case, the narrow sides 5 enclose an acute angle γ with the underside 3. This angle or inclination angle γ is expediently about 50°.

The cutting body 1 is formed like a parallelogram in the xy plane defined by the x direction and the y direction, i.e. as viewed in the direction of the top side 2 or the underside 3. The cutting body 1 is roughly trapezoidal as viewed in the direction of the longitudinal side 4 and thus in the xz plane defined by the x direction and the z direction.

FIG. 5 shows an insert holder 12 having a tangentially arranged cutting insert or cutting body 1. The latter is arranged on a holder land 13 of the insert holder 12 and for this purpose rests on the holder land 13 with the underside 3, which serves as locating surface. The holder land 13 is itself formed between two helical flutes 14, 15 of the insert holder 12. To this end, the insert holder 12 has on the holder land 13 a wedge-shaped recess 16. The latter in turn forms a first bearing surface 17, on which the cutting insert 1 rests with its underside 3. With that narrow side 5 which does not form the cutting edge 6 which is in use, the cutting insert 1 bears against a second bearing surface 18 running obliquely relative to the first bearing surface 17.

It can be seen from the cross section of the insert holder 12 shown in FIG. 6 that the cutting edge 6 which is in use runs radially in the direction of the holder center or the holder center point 19. It can be seen with reference to the depicted cutting circle 20 of the cutting insert 1 that the cutting insert 1, with its supporting surface 9 which is assigned to the cutting edge 6 which is in use, abuts virtually without a gap against a bore wall, represented by the cutting circle 20, of a workpiece to be machined. As a result, the cutting insert 1 and the insert holder 12 accommodating said cutting insert 1 are reliably supported against the bore wall.

It can also be seen that the opposite supporting surface 9 is at a comparatively large distance from the cutting circle 20. The reason for this is that the cutting insert 1, detachably held on the insert holder 12 by means of a fastening screw 22, or its center line 21 is arranged slightly above the center, i.e. above the center line 23 of the insert holder 12 and of the cutting circle 20, said center line 23 running parallel to the center line 21 of the cutting insert 1. As a result, sufficient free movement of the cutting insert 1 is produced with at the same time a suitable supporting function.

On account of the especially space-saving geometry of the cutting insert 1, its fitting size is correspondingly small, which is made possible by the tangential arrangement or positioning of the cutting insert 1 on the insert holder 12. This in turn leads to the reduction in the cutting body diameter, such that bore diameters of less than 16 mm, in particular greater than or equal to 8 mm, can be produced in a simple and reliable manner.

The invention claimed is:

1. A cutting insert comprising:
    a top side;
    an underside which is opposite the topside at a distance of a cutting body thickness running in a z direction;
    two longitudinal sides which run in an x direction;
    two narrow sides which run generally in a y direction; and
    at least one cutting edge which is formed between one of the longitudinal sides and one of the narrow sides and which extends over approximately the entire cutting body thickness,
    wherein two diagonally opposite cutting edges are provided,
    wherein the cutting edges run obliquely toward the underside,
    wherein a rake face running between the top side and the underside is provided in the longitudinal side facing the respective cutting edge,
    wherein a supporting surface inclined toward the underside is provided between the top side and the respective longitudinal side, and
    wherein at least one of the narrow sides runs obliquely at an inclination angle relative to a plane defined by the x direction and the z direction.

2. The cutting insert as claimed in claim 1, wherein the inclination angle is approximately equal to 20°.

3. The cutting insert as claimed in claim 2, wherein the cutting edge runs obliquely toward the opposite longitudinal side.

4. The cutting insert as claimed in claim 1, wherein the cutting edge is inclined while forming an acute angle between the narrow side and the underside.

5. The cutting insert as claimed in claim 4, wherein the acute angle is approximately equal to 50°.

6. The cutting insert as claimed in claim 1, wherein the rake face is designed as a flute drawn into the cutting body.

7. The cutting insert as claimed in claim 1, wherein a through-hole extends in the z direction in the cutting body for accommodating a fastening screw.

8. An insert holder having at least one tangentially arranged cutting insert as claimed in claim 1.

9. The insert holder as claimed in claim 8, having a holder land which runs in the holder longitudinal direction and on which the cutting body is detachably held.

10. The insert holder as claimed in claim 8, further comprising a wedge-shaped cutting body receptacle having a first bearing surface, on which the cutting insert rests with its underside, and having a second bearing surface, against which the cutting insert bears with its narrow side.

11. The insert holder as claimed in claim 8, wherein the cutting edge which is in use runs radially in the direction of the holder center point.

\* \* \* \* \*